(12) United States Patent
Ookubo (10) Patent No.: US 10,821,533 B2
(45) Date of Patent: Nov. 3, 2020

(54) WIRE ELECTRICAL DISCHARGE MACHINE

(71) Applicant: FANUC CORPORATION, Yamanashi (JP)

(72) Inventor: Kousuke Ookubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 17 days.

(21) Appl. No.: 16/351,108

(22) Filed: Mar. 12, 2019

(65) Prior Publication Data

US 2019/0283159 A1    Sep. 19, 2019

(30) Foreign Application Priority Data

Mar. 14, 2018    (JP) .................................. 2018-046951

(51) Int. Cl.
*B23H 7/06*  (2006.01)
*B23H 7/20*  (2006.01)
(Continued)

(52) U.S. Cl.
CPC ................ *B23H 7/20* (2013.01); *B23H 7/065* (2013.01); *B23H 7/105* (2013.01); *B23H 7/26* (2013.01);
(Continued)

(58) Field of Classification Search
CPC .......... B23H 7/20; B23H 7/065; B23H 7/105; B23H 7/26; G05B 19/182; G05B 2219/45043; G05B 2219/45221
See application file for complete search history.

(56) References Cited

U.S. PATENT DOCUMENTS 4,868,760 A * 9/1989 Obara .................... B23H 7/065
                                                   700/162
5,418,344 A * 5/1995 Magara ................. B23H 7/065
                                                   219/69.12
(Continued)

FOREIGN PATENT DOCUMENTS

GB          1590640 A      6/1981
JP          S53-064638 A   6/1978
(Continued)

OTHER PUBLICATIONS

Office Action issued in JP 2018-046951; mailed by the Japanese Patent Office dated Jan. 21, 2020.
(Continued)

*Primary Examiner* — Thomas C Lee
*Assistant Examiner* — Gary Collins
(74) *Attorney, Agent, or Firm* — Studebaker & Brackett PC (57) ABSTRACT

To provide a wire electrical discharge machine for which the machining precision of corner parts and corner exit parts in a workpiece are improved. A wire electrical discharge machine includes a machining path compensation unit which compensates a machining path, in a case of creating a corner part which is a circular arc as a second machining block, by compensating a position of a center of the circular arc of the second machining block by way of a first compensation vector calculated based on at least one indicator among the four indicators of deflection of a wire electrode, etc., and inserting a linear first compensation block between an end point of the first machining block and a start point of a second machining block which was compensated, and by eliminating a predetermined distance from the start point of a third machining block, creates a starting point of this third machining block, and then inserts a second compensation block between the end point of the compensated second (Continued)

machining block and the created starting point of the first machining block.

9 Claims, 10 Drawing Sheets

(51) Int. Cl.
    *B23H 7/10*     (2006.01)
    *B23H 7/26*     (2006.01)
    *G05B 19/18*     (2006.01)

(52) U.S. Cl.
    CPC .. *G05B 19/182* (2013.01); *G05B 2219/45043* (2013.01); *G05B 2219/45221* (2013.01)

(56) References Cited

U.S. PATENT DOCUMENTS

| | | | |
|---|---|---|---|
| 5,919,380 A * | 7/1999 | Magara | B23H 7/065 |
| | | | 219/69.16 |
| 6,774,334 B1 * | 8/2004 | Kobayashi | B23H 7/065 |
| | | | 219/69.12 |
| 6,935,456 B2 | 8/2005 | Korechika et al. | |
| 2011/0100959 A1 * | 5/2011 | Onodera | B23H 7/065 |
| | | | 219/69.13 |
| 2011/0226742 A1 * | 9/2011 | Onodera | B23H 7/065 |
| | | | 219/69.13 |
| 2014/0190940 A1 * | 7/2014 | Hiraga | G05B 19/4097 |
| | | | 219/69.12 |
| 2014/0330423 A1 * | 11/2014 | Hara | B23H 7/20 |
| | | | 700/162 |
| 2015/0183039 A1 * | 7/2015 | Irie | B23H 9/00 |
| | | | 219/69.12 |
| 2015/0239055 A1 * | 8/2015 | Niu | B23H 1/02 |
| | | | 219/69.12 |
| 2016/0236292 A1 * | 8/2016 | Onodera | B23H 7/065 |
| 2016/0346853 A1 * | 12/2016 | Tuboguchi | B23H 7/065 |
| 2017/0173714 A1 * | 6/2017 | Ookubo | G05B 19/37 |

FOREIGN PATENT DOCUMENTS

| | | |
|---|---|---|
| JP | S56-062728 A | 5/1981 |
| JP | S58192722 A | 11/1983 |
| JP | H04217426 A | 8/1992 |
| JP | H10-058238 A | 3/1998 |
| JP | 2015123544 A | 7/2015 |

OTHER PUBLICATIONS

The extended European search report issued by the European Patent Office dated Aug. 12, 2019, which corresponds to EP19161850.3-1019 and is related to U.S. Appl. No. 16/351,108.

\* cited by examiner

WIRE ELECTRICAL DISCHARGE MACHINE

This application is based on and claims the benefit of priority from Japanese Patent Application No. 2018-046951, filed on 14 Mar. 2018, the content of which is incorporated herein by reference.

BACKGROUND OF THE INVENTION

Field of the Invention

The present invention relates to a wire electrical discharge machine.

Related Art

Conventionally, wire electrical discharge machining has been known as one type of electrical discharge machining. In wire electrical discharge machining, machining of a shape profile is performed on a workpiece by causing a discharge phenomenon to occur between a wire electrode having conductivity and a workpiece. The wire electrical discharge machining is performed by a wire electrical discharge machine. The wire electrical discharge machine includes a mechanical section which supports the workpiece and the wire electrode; and a structure which continuously supplies wire electrode that is consumed accompanying the discharge phenomenon, and includes a structure which controls the relative position between the wire electrode and workpiece according to a numerical control device.

The wire electrode is wound in a form gathered on a cylindrical bobbin, and is drawn from the bobbin by a structure which continuously supplies the wire electrode that is equipped to the wire electrical discharge machine. In addition, the wire electrical discharge machine has a guide which is a structure supporting the wire electrode at the proper position, and has a mechanism and function of controlling the tension on the wire electrode by way of a numerical control device. In addition, the wire electrical discharge machine has a function of monitoring and controlling the state of the discharge occurring between the wire electrode and the workpiece by way of the numerical control device. In addition, by making an arbitrary movement command on the numerical control device, the wire electrical discharge machine is able to machine the shape profile on the workpiece by way of the wire electrode (refer to Patent Documents 1, 2 and 3).

Patent Document 1: Japanese Unexamined Patent Application, Publication No. S58-192722
Patent Document 2: Japanese Unexamined Patent Application, Publication No. H04-217426
Patent Document 3: Japanese Unexamined Patent Application, Publication No. 2015-123544

SUMMARY OF THE INVENTION

Figure 8A:
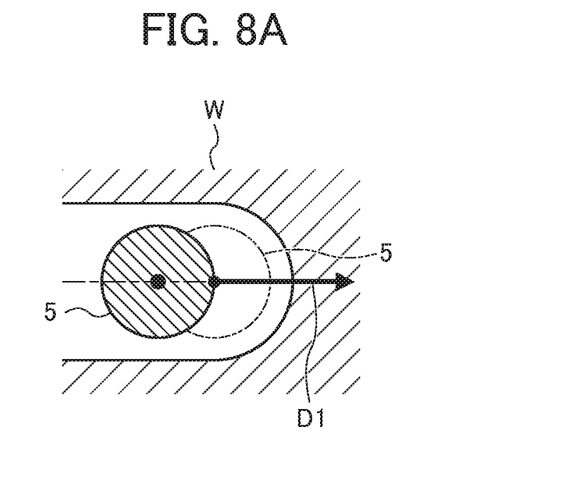
FIG. 8A is a cross-sectional view for explaining displacement between a command position and actual position due to flex of the wire electrode.
Figure 8B:
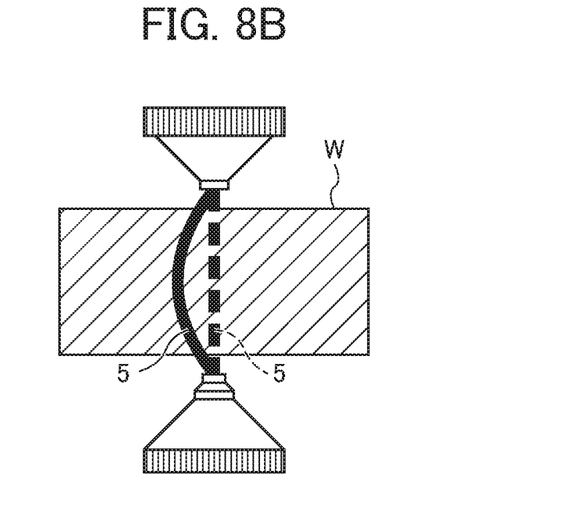
FIG. 8B is a longitudinal sectional view for explaining displacement between a command position and actual position due to bending of the wire electrode.
Figure 9A:
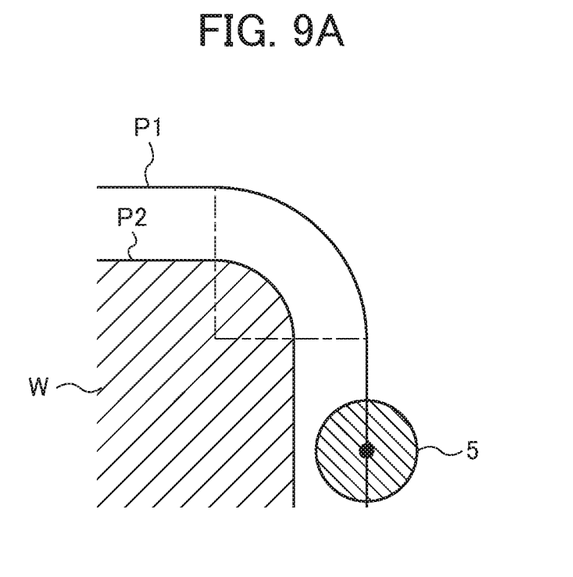
FIG. 9A is a cross-sectional view for explaining a path length difference between a machining path and program path of a convex arc corner.
Figure 9B:
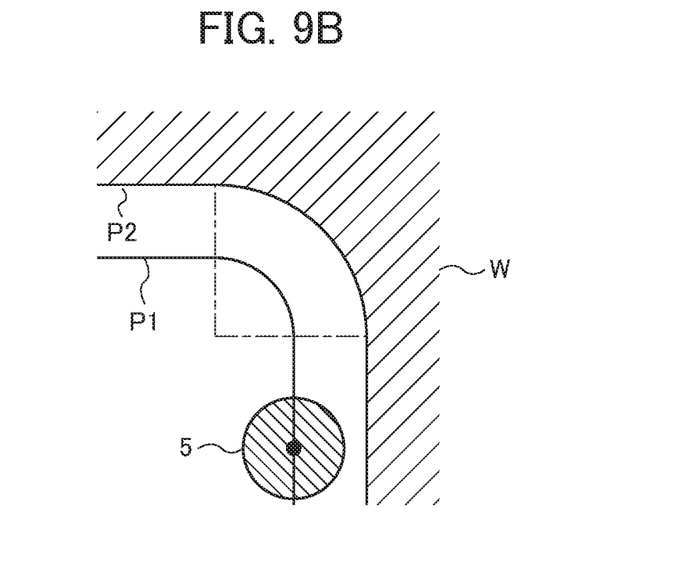
FIG. 9B a cross-sectional view for explaining a path length difference between a machining path and program path of a concave arc corner.
Figure 10A:
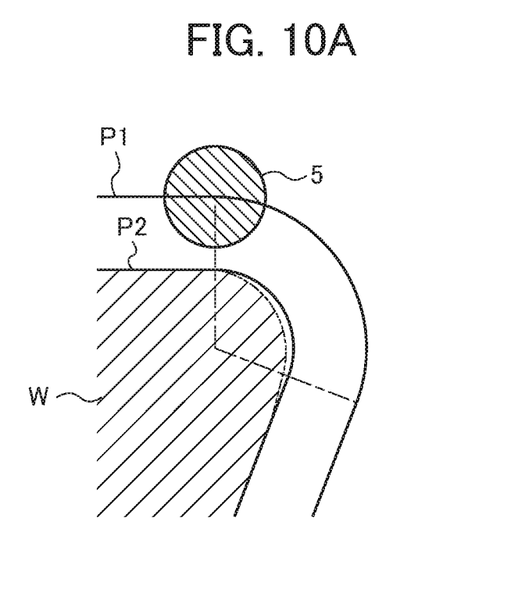
FIG. 10A is a cross-sectional view for explaining machining precision of a convex arc corner.
Figure 10B:
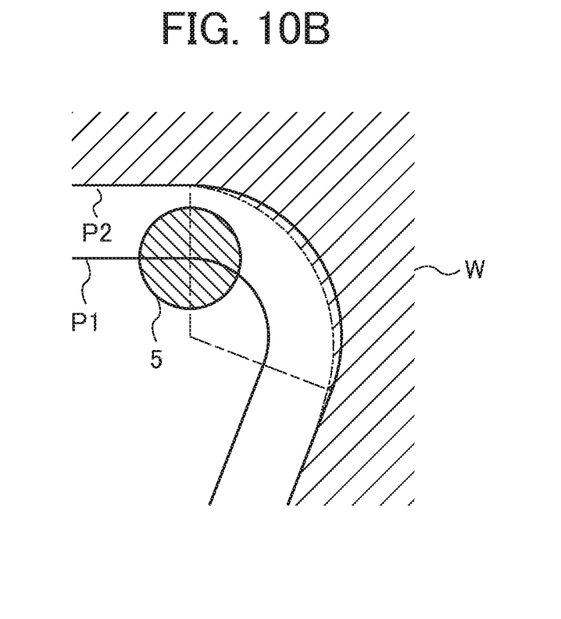
FIG. 10B is a cross-sectional view for explaining machining precision of a concave arc corner.

In the case of machining an arc corner of a workpiece W with a wire electrical discharge machine, displacement between the command position of the wire electrode 5 (illustrated by dotted line) and the actual position thereof (illustrated by solid line) occurs due to the wire electrode 5 bending to the opposite side in the machining direction D1, as shown in FIGS. 8A and 8B. In addition, as shown in FIGS. 9A and 9B, a path length difference between machining path P1 and program path P2 arises. Relative to the program path P2, as shown in FIG. 10A, excessive intake occurs at a corner part and corner exit part due to the electrical discharge density increasing at a convex arc corner, and as shown in FIG. 10B, the machining precision of the arc corner declines due to residual occurring at the corner part and corner exit part since the discharge density lowers at the concave arc corner. Regarding the excessive intake and residual at the corner part and corner exit part, it is dealt with by a method such as a change in electrical discharge control at the corner part and corner exit part, and NC program path compensation; however, there are still many improvements.

The present invention has an object of providing a wire electrical discharge machine for which the machining precision of the corner parts and corner exit parts of a workpiece are improved.

A wire electrical discharge machine (for example, the wire electrical discharge machine 1 described later) according to a first aspect of the present invention creates a machining path (for example, the machining path P1 described later) consisting of successive first, second and third machining blocks (for example, the first machining block B1, second machining block B2, and third machining block B3 described later) based on commands of a machining program, and performs electrical discharge machining on a workpiece (for example, the workpiece W described later) by making a wire electrode (for example, the wire electrode 5 described later) and the workpiece to relatively move according to the machining path), in which the wire electrical discharge machine including a machining path compensation unit which compensates the machining path, in a case of creating a corner part (for example, the corner part Wa, Wb described later) which is a circular arc as the second machining block, by compensating a position of the center of a circular arc of the second machining block by way of a compensation vector (for example, the first compensation vector V1 described later) calculated based on at least one indicator among four indicators of: deflection of the wire electrode; amount of change in voltage between the wire electrode and the workpiece in the second machining block relative to the first machining block; amount of change in relative movement speed between the wire electrode and the workpiece in the second machining block relative to the first machining block; and amount of change in electrical discharge pulse number per unit time between the wire electrode and the workpiece in the second machining block relative to the first machining block; and inserting a linear first compensation block (for example, the first compensation block AB1 described later) between an end point of the first machining block and a start point of the second machining block which was compensated; and creating a starting point of the third machining block by eliminating or extending a predetermined distance from a start point of the third machining block, and then inserting a second compensation block (for example, the second compensation block AB2, AB2' described later) between the end point of the second machining block which was compensated, and the starting point of the third machining block which was created.

According to a second aspect of the present invention, in the wire electrical discharge machine as described in the first aspect, the machining path compensation unit may calculate the compensation vector based on a correction factor according to the radius and central angle of a circular arc of the second machining block.

According to a third aspect of the present invention, in the wire electrical discharge machine as described in the second aspect, the machining path compensation unit may compensate the radius of the circular arc of the second machining block according to the correction factor, without changing the position of the start point of the second machining block which was compensated by the compensation vector.

According to a fourth aspect of the present invention, in the wire electrical discharge machine as described in the third aspect, the second compensation block may be a circular arc extending the second machining block in which the radius was compensated.

According to a fifth aspect of the present invention, in the wire electrical discharge machine as described in any one of the first to fourth aspects, the machining path compensation unit may calculate the predetermined distance based on at least one indicator among four indicators of: deflection of the wire electrode; amount of change in voltage between the wire electrode and the workpiece in the third machining block relative to the second machining block; amount of change in relative movement speed between the wire electrode and the workpiece in the third machining block relative to the second machining block; and amount of change in electrical discharge pulse number per unit time between the wire electrode and the workpiece in the third machining block relative to the second machining block.

According to a sixth aspect of the present invention, in the wire electrical discharge machine as described in the fifth aspect, the machining path compensation unit may calculate the predetermined distance based on the correction factor.

According to the present invention, it is possible to provide a wire electrical discharge machine for which the machining precision of the core part and corner exit part of a workpiece are improved.

DETAILED DESCRIPTION OF THE INVENTION

Figure 1:
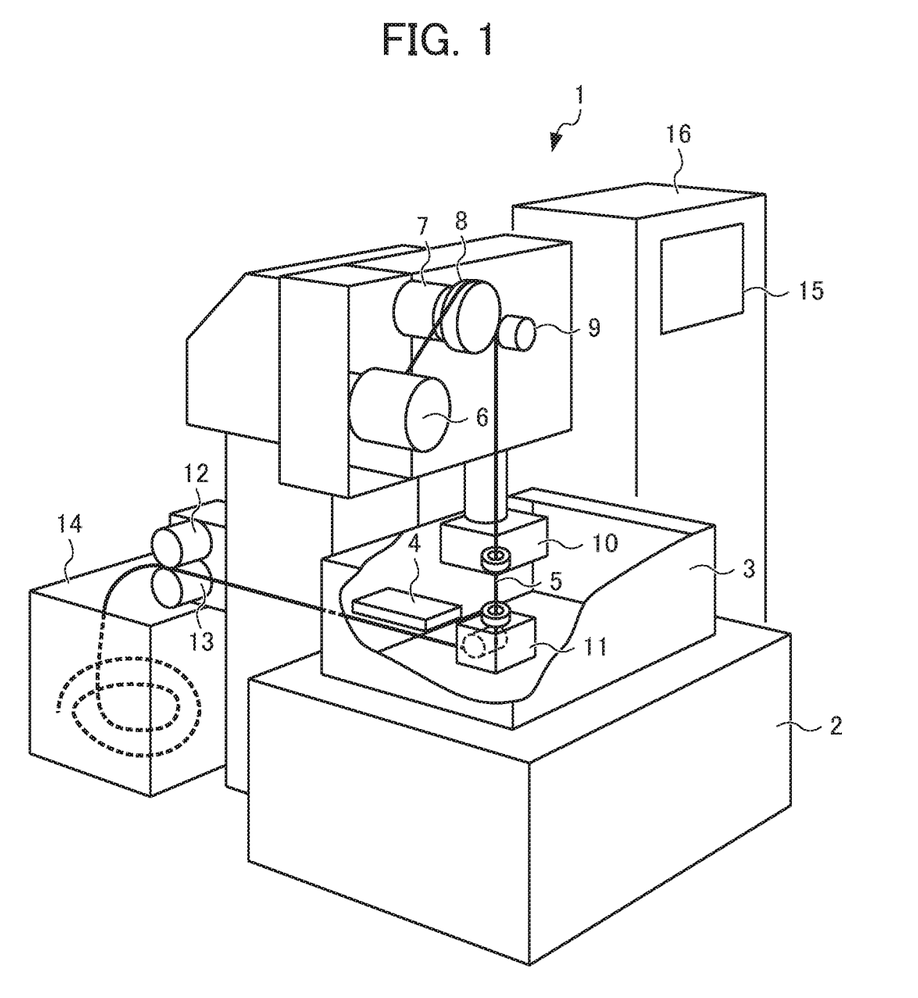
FIG. 1 is a schematic perspective view showing a wire electrical discharge machine according to an embodiment of the present invention.

Hereinafter, an embodiment of the present invention will be explained in detail while referencing the drawings. First, the configuration of a wire electrical discharge machine 1 will be explained by referencing FIG. 1. FIG. 1 is a schematic perspective view showing the wire electrical discharge machine 1 according to an embodiment of the present invention.

The wire electrical discharge machine 1 shown in FIG. 1 is a numerical control machine tool which creates a machining path P1 (refer to FIG. 2A, etc.) consisting of a plurality of machining blocks (e.g., successive first, second and third machining blocks), based on the commands of a machining program, and performs electrical discharge machining by making a wire electrode 5 and workpiece W relatively move according to this machining path P1. More specifically, the wire electrical discharge machine 1 includes a bed 2, a work tank 3, a work table 4, a wire electrode 5, a wire bobbin 6, a motor/powder brake 7, a brake roller 8, a pinch roller 9, an upper guide 10, a lower guide 11, a pinch roller 12, a feed roller 13, a wire recovery box 14, CNC (numerical control device) 15, a machining power supply 16, a machining path compensation unit (not shown), various detection units (not shown), etc.

The bed 2 is a machine stand on which the work tank 3 is placed. The work tank 3 is a space for performing electrical discharge machining in which dielectric working fluid is filled. The work table 4 is a stand on which the workpiece W is placed, and is determined by the relative position with the wire electrode 5 being controlled by the CNC 15.

The wire electrode 5 is drawn from the wire bobbin 6, and is recovered by the wire recovery box 14 by passing through the brake roller 8 which is driven by the motor/powder brake 7, the pinch roller 9, upper guide 10, lower guide 11, pinch roller 12 and feed roller 13. This wire electrode 5 is supported by the upper guide 10 and lower guide 11 within the work tank 3, and is stretched linearly between the upper guide 10 and lower guide 11. This linearly stretched wire electrode 5 performs electrical discharge machining on the workpiece W in a state immersed in the dielectric working fluid.

With the wire bobbin 6, a predetermined torque is applied in the reverse direction from the drawing direction of the wire electrode 5, by a torque motor which is not illustrated. The positions of the upper guide 10 and lower guide 11 are fixed or variable, depending on the shape and/or fixing method of the workpiece W, and a program according to the shape machined into the workpiece W. The machining power supply 16 makes electrical discharge machining on the workpiece W possible by applying high-frequency voltage to the wire electrode 5.

The machining path compensation unit (not shown) compensates the machining path of the wire electrical discharge machine 1 according to a sequence such as that described later in detail. The machining path compensation unit is configured by a CPU, ROM, RAM, etc. This machining path compensation unit may be provided to the wire electrical discharge machine 1 or CNC 15, or may be provided to a separate computer from these.

As various detection units (not shown), the wire electrical discharge machine 1 includes a deflection detection unit which detects the deflection of the wire electrode 5 stretched between the upper guide 10 and lower guide 11; a voltage detection unit which detects the voltage between the wire electrode 5 and workpiece W; a relative movement speed detection unit which detects the relative movement speed between the wire electrode 5 and workpiece W; and a discharge pulse number detection unit which detects the discharge pulse number per unit time between the wire electrode 5 and workpiece W; etc.

Figure 2A:
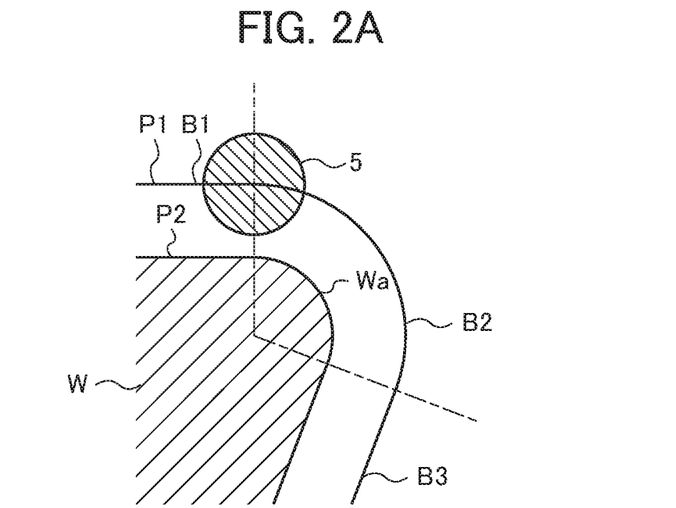
FIG. 2A is a cross-sectional view for explaining a case of creating a corner part which is a convex arc as a second machining block.
Figure 2B:
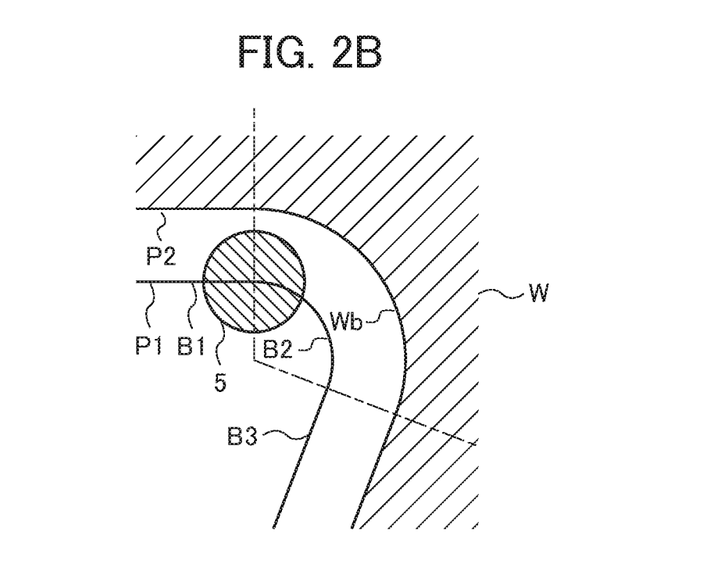
FIG. 2B is a cross-sectional view for explaining a case of creating a corner part which is a concave arc as a second machining block.
Figure 3A:
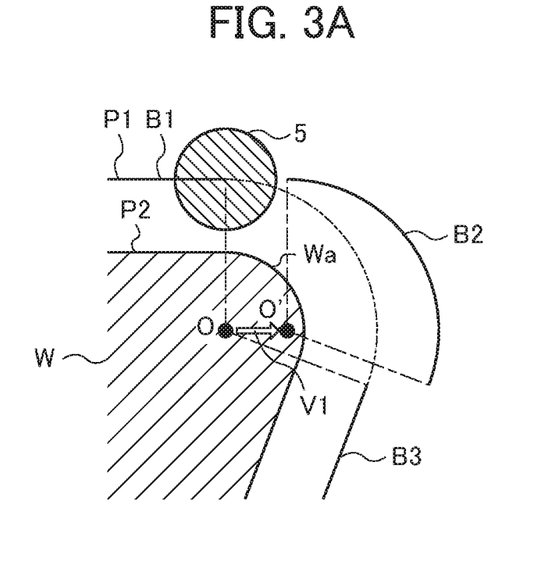
FIG. 3A is a cross-sectional view for explaining a first compensation vector in a case of creating a corner part which is a convex arc as the second machining block.
Figure 3B:
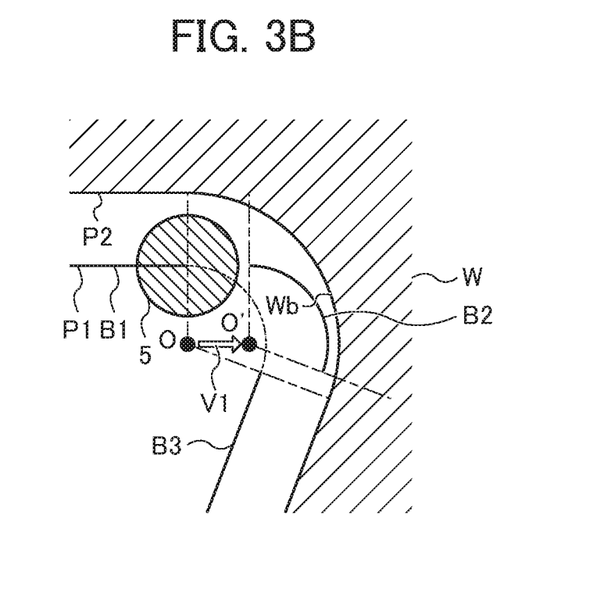
FIG. 3B is a cross-sectional view for explaining a first compensation vector in a case of creating a corner part which is a concave arc as the second machining block.
Figure 4A:
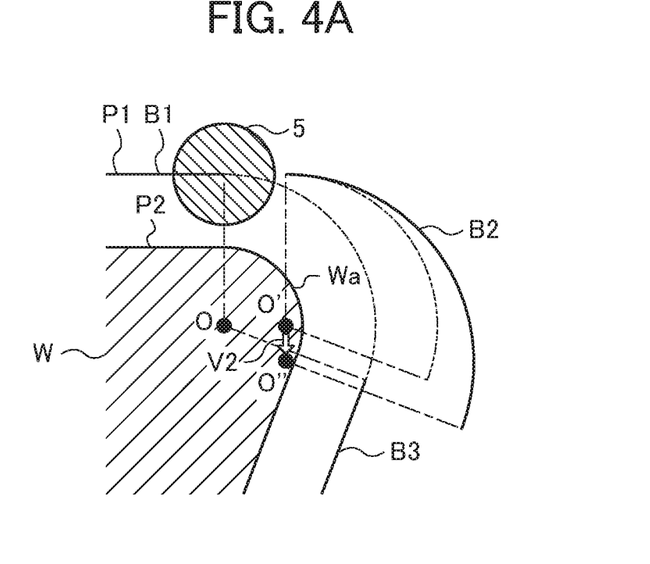
FIG. 4A is a cross-sectional view for explaining compensation of the radius of this convex arc in the case of creating a corner part which is a convex arc as the second machining block.
Figure 4B:
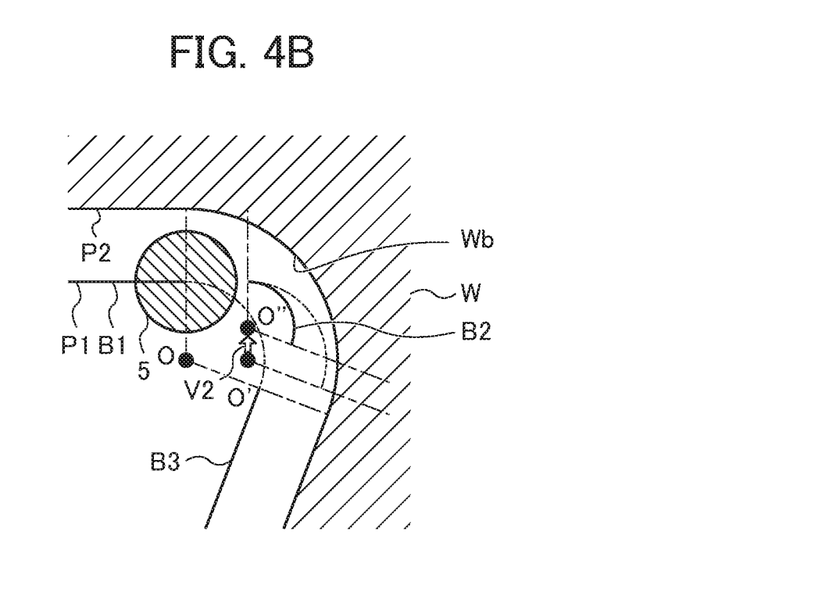
FIG. 4B is a cross-sectional view for explaining compensation of the radius of this convex arc in the case of creating a corner part which is a concave arc as the second machining block.
Figure 5A:
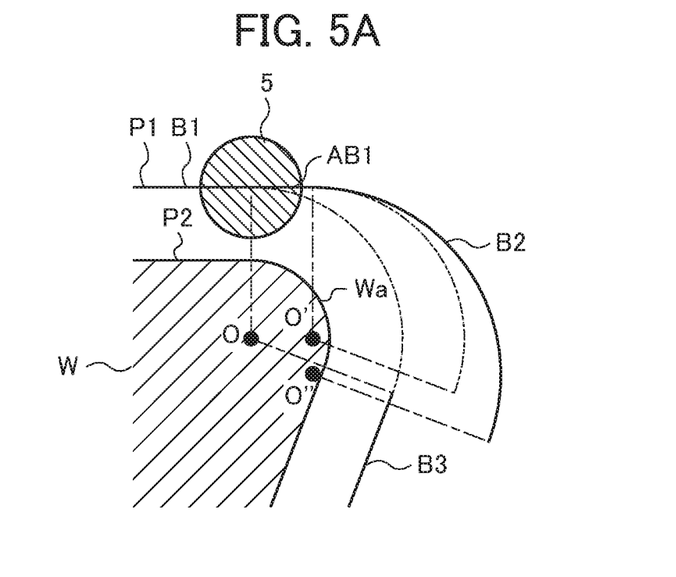
FIG. 5A is a cross-sectional view for explaining insertion of a first compensation block in the case of creating a corner part which is a convex arc as the second machining block.
Figure 5B:
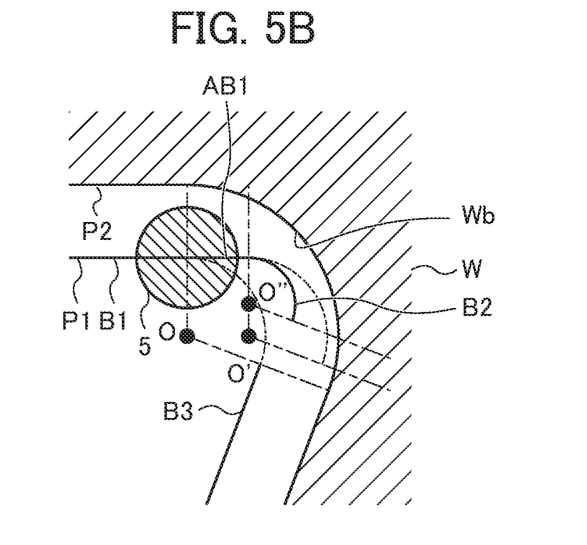
FIG. 5B is a cross-sectional view for explaining insertion of a first compensation block in the case of creating a corner part which is a concave arc as the second machining block.
Figure 6A:
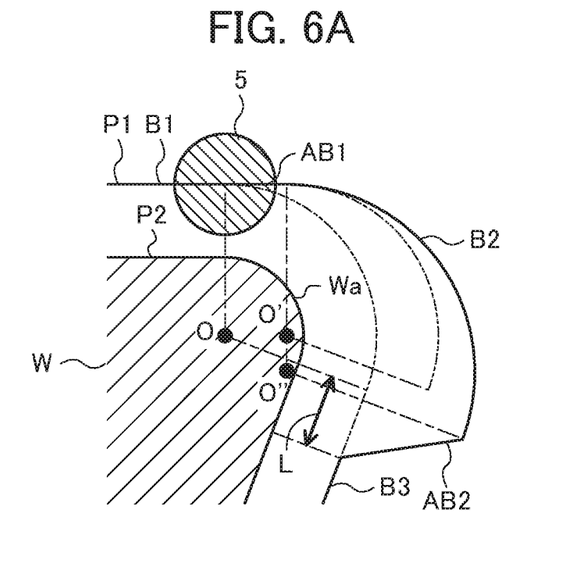
FIG. 6A is a cross-sectional view for explaining insertion of a second compensation block which is a straight line in the case of creating a corner part which is a convex arc as the second machining block.
Figure 6B:
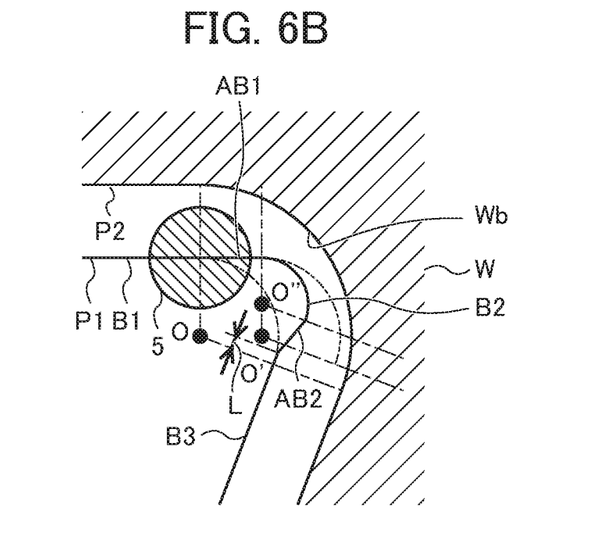
FIG. 6B is a cross-sectional view for explaining insertion of a second compensation block which is a straight line in the case of creating a corner part which is a concave arc as the second machining block.
Figure 7A:
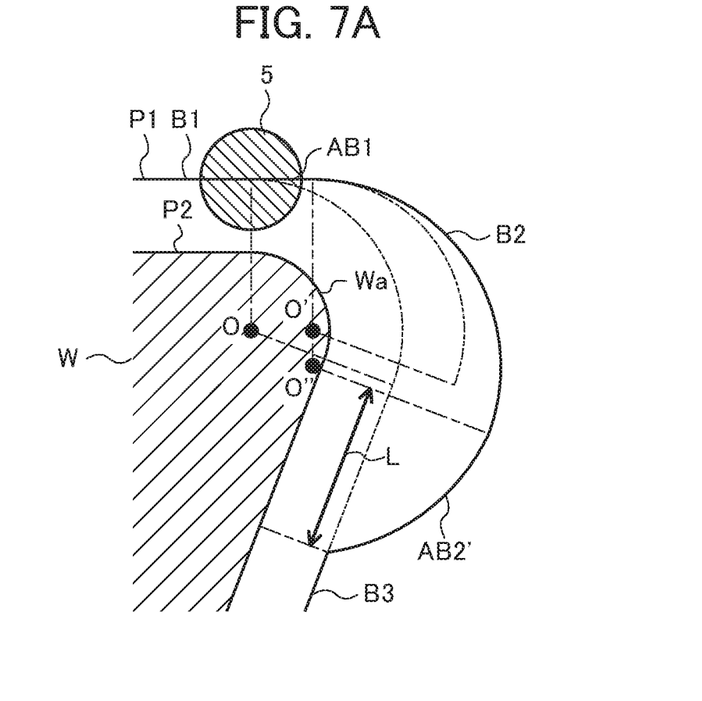
FIG. 7A is a cross-sectional view for explaining insertion of a second compensation block which is an arc in the case of creating a corner part which is a convex arc as the second machining block.
Figure 7B:
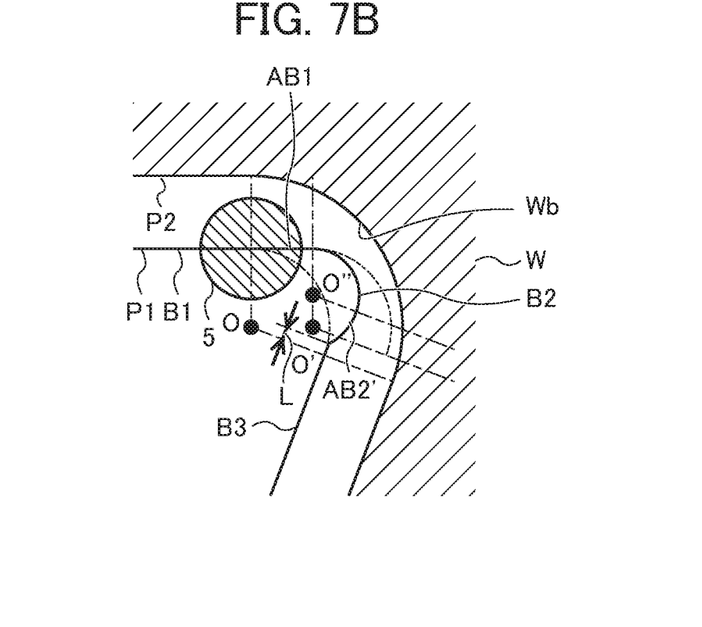
FIG. 7B is a cross-sectional view for explaining insertion of a second compensation block which is an arc in the case of creating a corner part which is a concave arc as the second machining block.

Next, electrical discharge machining using the wire electrical discharge machine 1 will be explained by referencing FIGS. 2 to 10. Compensation of the machining path in the following electrical discharge machining is executed by the aforementioned machining path compensation unit. FIG. 2A is a cross-sectional view for explaining a case of creating a corner part Wa, which is a convex arc as a second machining block B2. FIG. 2B is a cross-sectional view for explaining a case of creating a corner part Wb, which is a concave arc as the second machining block B2. FIG. 3A is a cross-sectional view for explaining a first compensation vector V1 in the case of creating a corner part Wa, which is a convex arc as the second machining block B2. FIG. 3B is a cross-sectional view for explaining a first compensation vector V1 in the case of creating a corner part Wb, which is a concave arc as the second machining block B2. FIG. 4A is a cross-sectional view for explaining compensation of the radius of this convex arc in the case of creating the corner part Wa, which is a convex arc as the second machining block B2. FIG. 4B is a cross-sectional view for explaining compensation of the radius of this concave arc in the case of creating the corner part Wb, which is a concave arc as the second machining block B2. FIG. 5A is a cross-sectional view for explaining insertion of a first compensation block AB1 in the case of creating the corner part Wa, which is a convex arc as the second machining block B2. FIG. 5B is a cross-sectional view for explaining insertion of the first compensation block AB1 in the case of creating the corner part Wb, which is a concave arc as the second machining block B2. FIG. 6A is a cross-sectional view for explaining insertion of a linear second compensation block AB2 in the case of creating the corner part Wa, which is a convex arc as the second machining block B2. FIG. 6B is a cross-sectional view for explaining insertion of a linear second compensation block AB2 in the case of creating the corner part Wb, which is a concave arc as the second machining block B2. FIG. 7A is a cross-sectional view for explaining insertion of an arc second compensation block AB2' in the case of creating the corner part Wa, which is a convex arc as the second machining block B2. FIG. 7B is a cross-sectional view for explaining insertion of an arc second compensation block AB2' in the case of creating the corner part Wb, which is a concave arc as the second machining block B2. It should be noted that, in each drawing, the machining path P1 is a path through which the centerline of the wire electrode 5 passes, and the program path P2 is a path along the shape profile of the workpiece W.

As shown in FIG. 2A, the machining path P1 consisting of the successive first, second and third machining blocks B1, B2 and B3. This machining path P1, due to being a path creating the corner part Wa, which is a convex arc as the second machining block B2, is compensated as explained hereinafter. Alternatively, as shown in FIG. 2B, the machining path P1 consists of the successive first, second and third machining blocks B1, B2 and B3. This machining path P1 is compensated as explained hereinafter, due to being a path creating the corner part Wb, which is a concave arc as the second machining block B2.

As shown in FIG. 3A, the position of the center of the arc of the second machining block B2 is compensated from 0 to 0', by way of the first compensation vector V1. Alternatively, as shown in FIG. 3B, the position of the center of the arc of the second machining block B2 is compensated from 0 to 0', by way of the first compensation vector V1.

The first compensation vector V1 is calculated based on at least one indicator among the four indicators of: deflection of the wire electrode 5, amount of change in voltage between the wire electrode 5 and workpiece W of the second machining block B2 relative to the first machining block B1, amount of change in relative movement speed between the wire electrode 5 and workpiece W of the second machining block B2 relative to the first machining block B1, and amount of change in discharge pulse number per unit time between the wire electrode 5 and workpiece W of the second machining block B2 relative to the first machining block B1. In addition, the first compensation vector V1 is calculated based on a correction factor according to the radius and central angle of the arc of the second machining block B2.

The deflection of the wire electrode 5 is measured from measurement results of the deflection of the cross section of the workpiece W, or the oscillation frequency/tension variation of the wire electrode 5. As the voltage between the wire electrode 5 and workpiece W, a command value or measured value is used. As the relative movement speed between the wire electrode 5 and workpiece W, a command value or measured value is used. As the electrical discharge pulse number per unit time between the wire electrode 5 and workpiece W, a measured value is used.

For example, the first compensation vector V1 is calculated by $V1=f(r,\theta) \times (a_1 d + a_2(v_1-v_c) + a_3(V_1-V_c) + a_4(p_1-p_c))x_e$. Alternatively, the first compensation vector V1 is calculated by $V1=f(r,\theta) \times (a_1 d + a_2(v_1/v_c) + a_3(V_1/V_c) + a_4(p_1/p_c))x_e$.

Provided that $f(r,\theta)$ indicates a coefficient (correction factor) expressed by r and θ; r indicates the radius of the arc of the second machining block B2; θ indicates the central angle of the arc of the second machining block B2; d indicates the deflection of the wire electrode 5; $v_c$ indicates the relative movement speed between the wire electrode 5 and workpiece W in the first machining block B1; $V_1$ indicates the voltage between the wire electrode 5 and workpiece W in the first machining block B1; $V_c$ indicates the voltage between the wire electrode 5 and workpiece W in the second machining block B2; $p_1$ indicates the electrical discharge pulse number per unit time between the wire electrode 5 and workpiece W in the first machining block B1; $p_c$ indicates the electrical discharge pulse number per unit time between the wire electrode 5 and workpiece W in the second machining block B2; $a_1$~$a_4$ indicates constants; and $x_e$ indicates a vector.

As shown in FIG. 4A, without changing the position of the origin of the second machining block B2 compensated by the first compensation vector V1 (refer to FIG. 3A), the radius of the arc of the second machining block B2 is compensated by setting the position of the center of the arc of the second machining block B2 from O' to O" by way of the second compensation vector V2 (correction factor). Alternatively, as shown in FIG. 4B, without changing the position of the origin of the second machining block B2 compensated by the first compensation vector V1 (refer to FIG. 3B), the radius of the arc of the second machining block B2 is compensated by setting the position of the center of the arc of the second machining block B2 from O' to O" by way of the second compensation vector V2 (correction factor).

The second compensation vector V2 is calculated based on at least one indicator among the four indicators of: deflection of the wire electrode 5, amount of change in voltage between the wire electrode 5 and workpiece W of the second machining block B2 relative to the first machining block B1, amount of change in relative movement speed between the wire electrode 5 and workpiece W of the second machining block B2 relative to the first machining block B1, and amount of change in discharge pulse number per unit time between the wire electrode 5 and workpiece W of the second machining block B2 relative to the first machining block B1. In addition, the second compensation vector V2 is calculated based on the correction factor according to the radius and central angle of the arc of the second machining block B2.

For example, the second compensation vector V2 is calculated by $V2=f(r,\theta)\times(b_1 d+b_2(v_1-v_c)+b_3(V_1-V_c)+b_4(p_1-p_c))y_e$. Alternatively, the second compensation vector V2 is calculated by $V2=f(r,\theta)\times(b_1 d+b_2(v_1/v_c)+b_3(V_1/V_c)+b_4(p_1/p_c))y_e$. Provided that $b_1$~$b_4$ indicate constants and $y_e$ indicates a vector.

As shown in FIG. 5A, a linear first compensation block AB1 is inserted between the end point of the first machining block B1 and the start point of the second machining block B2 compensated by the first compensation vector V1 (refer to FIG. 3A) and second compensation vector (refer to FIG. 4A). Alternatively, as shown in FIG. 5B, a linear first compensation block AB1 is inserted between the end point of the first machining block B1 and the start point of the second machining block B2 compensated by the first compensation vector V1 (refer to FIG. 3B) and the second compensation vector V2 (refer to FIG. 4B).

As shown in FIG. 6A, by eliminating a predetermined distance L from the start point of the third machining block B3, the starting point of this third machining block B3 is created, and then a linear second compensation block AB2 is inserted between the end point of the second machining block B2 compensated by the first compensation vector V1 (refer to FIG. 3A) and the second compensation vector V2 (refer to FIG. 4A), and the starting point of the created third machining block B3. Alternatively, as shown in FIG. 6B, by extending a predetermined distance L from the start point of the third machining block B3, the starting point of this third machining block B3 is created, and then a linear second compensation block AB2 is inserted between the end point of the second machining block B2 compensated by the first compensation vector V1 (refer to FIG. 3B) and the second compensation vector V2 (refer to FIG. 4B), and the starting point of the created third machining block B3.

The predetermined length L is calculated based on at least one indicator among the four indicators of: deflection of the wire electrode 5, amount of change in voltage between the wire electrode 5 and workpiece W of the third machining block B3 relative to the second machining block B2, amount of change in relative movement speed between the wire electrode 5 and workpiece W of the third machining block B3 relative to the second machining block B2, and amount of change in electrical discharge pulse number per unit time between the wire electrode 5 and workpiece W of the third machining block B3 relative to the second machining block B2. In addition, the predetermined distance L is calculated based on the correction factor according to the radius and central angle of the arc of the second machining block B2.

For example, the predetermined distance L is calculated by $L=f(r,\theta)\times(c_1 d+c_2(v_1-v_c)+c_3(V_1-V_c)+c_4(p_1-p_c))$. Alternatively, the predetermined distance L is calculated by $L=f(r,\theta)\times(c_1 d+c_2(v_1/v_c)+c_3(V_1/V_c)+c_4(p_1/p_c))$. Provided that $c_1$~$c_4$ indicate constants.

It should be noted that it may be configured so as to insert an arc second compensation block AB2' in place of inserting the linear second compensation block AB2 (refer to FIG. 6A and FIG. 6B).

As shown in FIG. 7A, the second compensation block AB2' is a circular arc extending the second machining block B2 in which the radius is compensated by the second compensation vector V2 (refer to FIG. 4A). Alternatively, as shown in FIG. 7B, the second compensation block AB2' is a circular arc extending the second machining block B2 in which the radius is compensated by the second compensation vector V2 (refer to FIG. 4B).

In the above way, according to the wire electrical discharge machine 1 according to the present embodiment, it is possible to improve the machining precision of the corner parts Wa, Wb and corner exit part in the workpiece W.

Although an embodiment of the present invention has been explained above, the present invention is not limited to the aforementioned embodiment. In addition, the effects described in the present embodiment are merely listing the most preferred effects produced from the present invention, and the effects according to the present invention are not to be limited to those described in the present embodiment.

For example, it is also possible to set the first compensation vector V1 (refer to FIG. 3A and FIG. 3B) as a zero vector, and compensate the position O of the center of the circular arc of the second machining block B2 by only the second compensation vector V2 (refer to FIG. 4A and FIG. 4B). In this case, insertion of the linear first compensation vector AB1 (refer to FIG. 5A and FIG. 5B) is not carried out.

Similarly, it is also possible to set the second compensation vector V2 (refer to FIG. 4A and FIG. 4B) as a zero vector, and compensate the position O of the center of the circular arc of the second machining block B2 by only the first compensation vector V1 (refer to FIG. 3A and FIG. 3B).

Alternatively, it is also possible to set the predetermined distance L to be eliminated (refer to FIG. 6A and FIG. 6B) as zero, and without changing the origin of the third machining block B3, compensate the machining path P1 so as to link with the end point of the second machining block B2 compensated by the first compensation vector V1 (refer to FIG. 3A and FIG. 3B) and the second compensation vector V2 (refer to FIG. 4A and FIG. 4B).

It should be noted that a change of program is possible from the CNC 15 and from an external personal computer.

EXPLANATION OF REFERENCE NUMERALS

1 wire electrical discharge machine
2 bed
3 working tank
4 work table
5 wire electrode
6 wire bobbin
7 motor/powder brake
8 brake roller
9 pinch roller
10 upper guide
11 lower guide
12 pinch roller
13 feed roller
14 wire recovery box
15 CNC (numerical control device)
16 machining power supply
W workpiece
Wa, Wb corner part
P1 machining path
P2 program path
B1 first machining block
B2 second machining block
B3 third machining block
AB1 first compensation block
AB2, AB2' second compensation block
V1 first compensation vector (compensation vector)
V2 second compensation vector
D1 machining direction
O, O', O" center
L predetermined distance

What is claimed is:

1. A wire electrical discharge machine which creates a machining path consisting of successive first, second and third machining blocks based on commands of a machining program, and performs electrical discharge machining on a workpiece by making a wire electrode and the workpiece to relatively move according to the machining path, the wire electrical discharge machine comprising:
    a processor and a memory connectively coupled to the processor, the processor configured to compensate the machining path,
    in a case of creating a corner part which is a circular arc as the second machining block,
    by compensating a position of the center of a circular arc of the second machining block by way of a compensation vector calculated based on at least one indicator among four indicators of: deflection of the wire electrode; amount of change in voltage between the wire electrode and the workpiece in the second machining block relative to the first machining block; amount of change in relative movement speed between the wire electrode and the workpiece in the second machining block relative to the first machining block; and amount of change in electrical discharge pulse number per unit time between the wire electrode and the workpiece in the second machining block relative to the first machining block; and inserting a linear first compensation block between an end point of the first machining block and a start point of the second machining block which was compensated, and
    creating a starting point of the third machining block by eliminating or extending a predetermined distance from a start point of the third machining block, and then inserting a second compensation block between the end point of the second machining block which was compensated, and the starting point of the third machining block which was created, wherein
    the processor
        calculates the compensation vector based on a correction factor according to the radius and central angle of a circular arc of the second machining block, and based on the calculated compensation vector, creates the machining path for operation of the wire electrical discharge machine.

2. The wire electrical discharge machine according to claim 1, wherein
    the processor compensates the radius of the circular arc of the second machining block according to the correction factor, without changing the position of the start point of the second machining block which was compensated by the compensation vector.

3. The wire electrical discharge machine according to claim 2, wherein
    the second compensation block is a circular arc extending the second machining block in which the radius was compensated.

4. The wire electrical discharge machine according to claim 3, wherein
    the processor calculates the predetermined distance based on at least one indicator among four indicators of: deflection of the wire electrode; amount of change in voltage between the wire electrode and the workpiece in the third machining block relative to the second machining block; amount of change in relative movement speed between the wire electrode and the workpiece in the third machining block relative to the second machining block; and amount of change in electrical discharge pulse number per unit time between the wire electrode and the workpiece in the third machining block relative to the second machining block.

5. The wire electrical discharge machine according to claim 4, wherein
    the processor calculates the predetermined distance based on the correction factor.

6. The wire electrical discharge machine according to claim 2, wherein
    the processor calculates the predetermined distance based on at least one indicator among four indicators of: deflection of the wire electrode; amount of change in voltage between the wire electrode and the workpiece in the third machining block relative to the second machining block; amount of change in relative movement speed between the wire electrode and the workpiece in the third machining block relative to the second machining block; and amount of change in electrical discharge pulse number per unit time between the wire electrode and the workpiece in the third machining block relative to the second machining block.

7. The wire electrical discharge machine according to claim 6, wherein
    the processor calculates the predetermined distance based on the correction factor.

8. The wire electrical discharge machine according to claim 1, wherein the processor calculates the predetermined distance based on at least one indicator among four indicators of: deflection of the wire electrode; amount of change in voltage between the wire electrode and the workpiece in the third machining block relative to the second machining block; amount of change in relative movement speed between the wire electrode and the workpiece in the third machining block relative to the second machining block; and amount of change in electrical discharge pulse number per unit time between the wire electrode and the workpiece in the third machining block relative to the second machining block.

9. The wire electrical discharge machine according to claim 8, wherein the processor calculates the predetermined distance based on the correction factor.

\* \* \* \* \*